United States Patent
Price

(10) Patent No.: US 8,705,055 B2
(45) Date of Patent: Apr. 22, 2014

(54) PRINT JOB COMPLETION ESTIMATION MECHANISM

(75) Inventor: Stephen G. Price, Longmont, CO (US)

(73) Assignee: InfoPrint Solutions Company LLC, Boulder, CO (US)

(*) Notice: Subject to any disclaimer, the term of this patent is extended or adjusted under 35 U.S.C. 154(b) by 123 days.

(21) Appl. No.: 13/049,112

(22) Filed: Mar. 16, 2011

(65) Prior Publication Data

US 2012/0236342 A1 Sep. 20, 2012

(51) Int. Cl.
*G06F 3/12* (2006.01)

(52) U.S. Cl.
USPC ............ 358/1.13; 358/1.2; 358/1.9; 358/1.15

(58) Field of Classification Search
USPC .................. 358/1.13, 1.15, 1.2, 1.9
See application file for complete search history.

(56) References Cited

U.S. PATENT DOCUMENTS

| | | | |
|---|---|---|---|
| 6,006,013 A | 12/1999 | Rumph et al. | |
| 7,224,489 B2 | 5/2007 | Loce et al. | |
| 7,369,264 B2 | 5/2008 | Kobayashi | |
| 7,602,514 B2* | 10/2009 | Levin et al. | 358/1.15 |
| 7,701,605 B2* | 4/2010 | Miyata | 358/1.15 |
| 2002/0071134 A1* | 6/2002 | Jackson et al. | 358/1.13 |
| 2002/0186275 A1* | 12/2002 | Usui | 347/43 |
| 2006/0077468 A1 | 4/2006 | Loce et al. | |
| 2007/0109575 A1 | 5/2007 | Salgado et al. | |
| 2007/0188791 A1 | 8/2007 | Utsunomiya et al. | |
| 2008/0180727 A1* | 7/2008 | Chatow et al. | 358/1.15 |
| 2008/0181653 A1* | 7/2008 | Elzia et al. | 399/83 |
| 2010/0238484 A1 | 9/2010 | Komine | |
| 2010/0245910 A1* | 9/2010 | Maeda | 358/1.15 |
| 2011/0235092 A1* | 9/2011 | Bosma | 358/1.15 |
| 2012/0194830 A1* | 8/2012 | Gaertner et al. | 358/1.5 |

FOREIGN PATENT DOCUMENTS

| | | |
|---|---|---|
| JP | 2008146561 | 6/2008 |
| JP | 2008221639 | 9/2008 |

OTHER PUBLICATIONS

Tang, Chih-Yu, et al., "Network Aware Compression Based Rate Control for Printing Systems", IEEE 978-0-7695-3908-9, (2009), 123-128.

* cited by examiner

*Primary Examiner* — Allen H Nguyen
(74) *Attorney, Agent, or Firm* — Blakely, Sokoloff, Taylor & Zafman LLP

(57) ABSTRACT

A method disclosed. The method includes receiving a print job, transmitting a query to two or more printers requesting a time estimate to print the print job at each of the two or more printers, receiving the time estimates from the two or more printers and selecting a first of the two or more printers at which the print job is to be printed based on the received time estimates.

16 Claims, 3 Drawing Sheets

PRINT JOB COMPLETION ESTIMATION MECHANISM

FIELD OF THE INVENTION

The invention relates to the field of printing systems, and in particular, to print job management.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is typically implemented at a print server to manage a print job from job entry and management through the complete printing process. Print servers have the ability to route print jobs to multiple different printers by maintaining queues to each serviced printer.

Typically, a printer operator has the ability to move jobs between queues. There are several reasons as to why an operator may choose to move a job from one printer queue to another. For example, an operator may discover that the time to print the job may take excessively longer remaining in the current queue than if moved to another queue with fewer print jobs.

Currently, some host server printing software has the ability to provide time estimates for completing a print job at a particular printer based on basic knowledge about the printer (e.g., printer model X prints at 90 pages per minute (ppm)). However, many variables effect the actual print time of a job. Such variables include a time to switch between simplex and duplex, size of the medium sheet, switching between input drawers, time to fold, staple, trim, and/or bind a job, and time to perform automated or manual maintenance or calibration, etc. Thus, time estimates provided by printing software are often inaccurate.

Accordingly, an improved mechanism for providing a time estimate to complete a print job is desired.

SUMMARY

In one embodiment, a method is disclosed. The method includes receiving a print job, transmitting a query to two or more printers requesting a time estimate to print the print job at each of the two or more printers, receiving the time estimates from the two or more printers and selecting a first of the two or more printers at which the print job is to be printed based on the received time estimates Another embodiment discloses a print server including a printing software product. The printing software product transmits a query to two or more printers requesting a time estimate to print a print job at each of the two or more printers, receives the time estimates from the two or more printers and selects a first of the two or more printers at which the print job is to be printed based on the received time estimates.

In yet a further embodiment a printing system is disclosed. The printing system includes a print server to receive a print job and a printer to receive a query from the print server, calculate a time estimate to print the print job and transmit the time estimate to the print server.

BRIEF DESCRIPTION OF THE DRAWINGS

A better understanding of the present invention can be obtained from the following detailed description in conjunction with the following drawings, in which.

DETAILED DESCRIPTION

A print job completion estimation mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
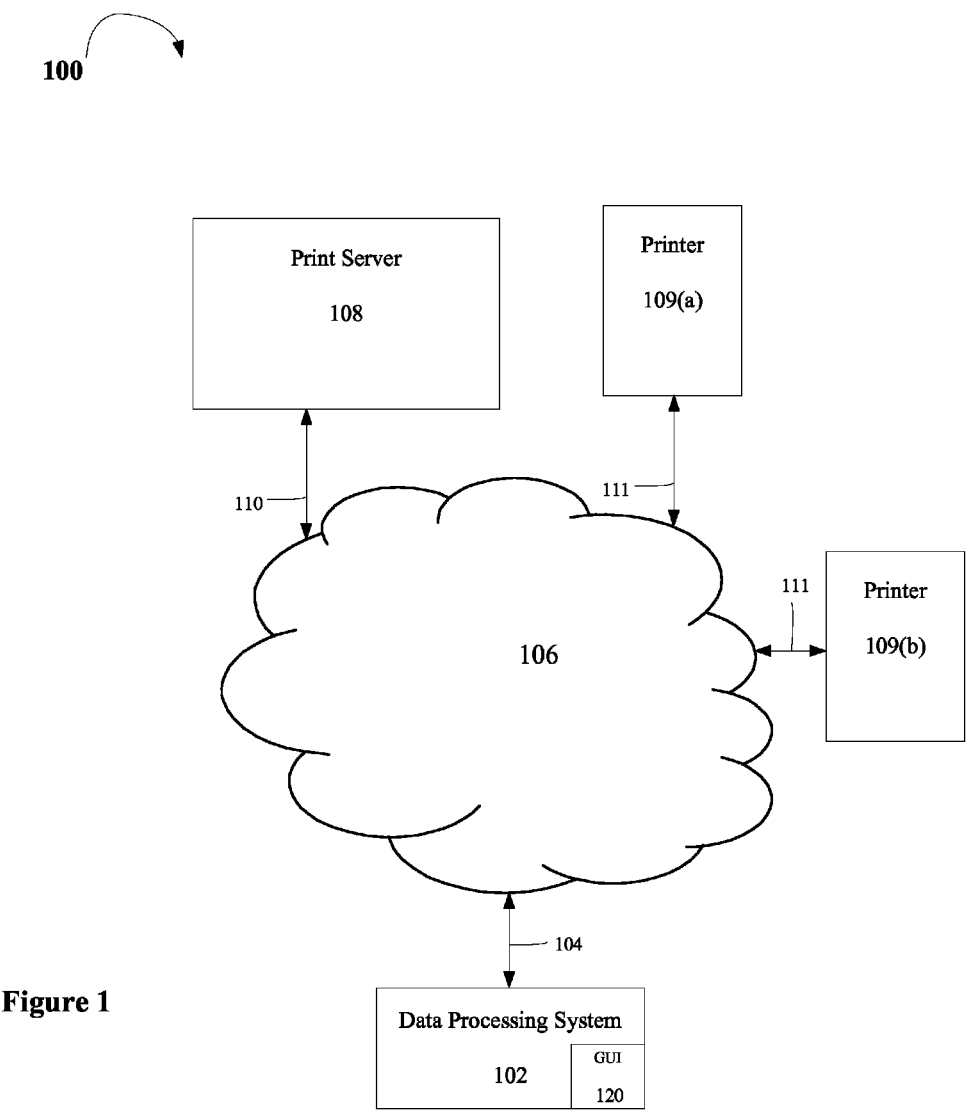
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art.

In one embodiment, data processing system 102 includes and employs the Windows operating system, or other operating system, and/or network drivers permitting data processing system 102 to communicate with network 106 for the purposes of employing resources within network 106. Network 106 may be a local area network (LAN) or any other network over which print requests may be submitted to a remote printer or print server.

Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111. In one embodiment, communications links 111 may include a Simple Network Management Protocol (SNMP). However, other communications protocols (e.g., Job Message Format (JMF)) may be implemented.

In one embodiment, the operating system on data processing system 102 allows a user to select the desired print server 108 and submit requests for service requests to either printer 109 via print server 108 over network 106. In a further embodiment, print server 108 includes a print queue corresponding to each printer 109, where each queue includes print jobs requested by remote data processing systems 102.

According to one embodiment, print server 108 implements a printing software product that manages the printing of documents between data processing system 102 and printers 109. In other embodiments, the printing software product manages printing of documents from multiple data processing systems 102 to the one or more printers 109.

According to one embodiment, the printing software product may be implemented using either InfoPrint Manager (IPM) or InfoPrint ProcessDirector (IPPD), although other types of printing software may be used instead. In a further embodiment, data processing system 102 includes a print application that interacts with the printing software product at printer server 108 to provide for efficient transmission of print jobs.

In one embodiment, the printing software product includes a graphical user interface (GUI) 120 that enables a system administrator (or operator) to interact with the printing software product and print application. In a further embodiment, the printing software product (either automatically or under operator control) has the ability to query a printer 109 as to an approximate amount of time that will be required to process one or more print jobs that are pending in a queue associated with the printer 109. In such an embodiment, printers 109 calculate a time estimate to process the pending print jobs and/or a print job the printing software product is considering submitting. Subsequently, the printers 109 report the estimate to the printing software product.

Figure 2:
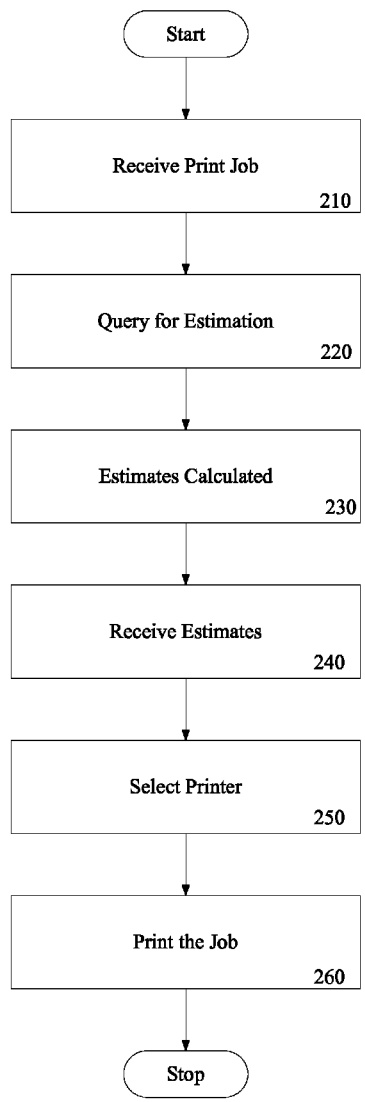
FIG. 2 is a flow diagram illustrating one embodiment of a print job time estimation process.

FIG. 2 is a flow diagram illustrating one embodiment of a print job time estimation process. At processing block 210, a print job is received at the printing software product from a data processing system 102. At processing block 220, the printing software product queries one or more printers 109 for an estimation of duration and time to print the job. In one embodiment, the query includes a transmission of the print job along with the request for time estimation.

In another embodiment, the query includes a job description. In such an embodiment, the job description includes a Job Definition Format (JDF) job ticket describing the media to be used for the job in the exact order it will be used. In other embodiments, the job description may include a number for each page size included in the job, or a simple list of media requests. In yet another embodiment, the query may include a basic PostScript program (or print job in other page description language) including blank/null pages with just the media selection commands the job for estimation.

At processing block 230, each queried printer 109 performs the estimation. In one embodiment, the estimation is based on size of the print job, number and size of print jobs currently in the queue and printer performance capabilities (e.g., pages printed per minute). Additionally, printers 109 consider other factors in the estimation calculation (e.g., time to switch between simplex and duplex, size of the medium sheet, switching between input drawers, time to fold, staple, trim, and/or bind a job, and time to perform automated or manual maintenance or calibration, print resolution, print quality setting, print speed setting, paper weight, paper thickness, dryer or fuser temperature, simplex printing speed vs. duplex printing speed, color vs. monochrome speed, etc.).

At processing block 240, the query estimates (e.g., job duration and theoretical completion time (assuming job submitted now and no other job submitted before)) are received back at the printing software product. At processing block 250, the printing software product selects the printer 109 to which the print job is to be transmitted for processing based on the received estimation calculations. At processing block 260, the job is forwarded to the selected printer 109 where it is printed.

In an embodiment where the full job is transmitted for estimation, printer 109 may hold on to the job without having started it yet. Subsequently, the printing software product would command for the job to be submitted to the print queue upon selection of the printer 109. This process prevents having to transmit the job across the network twice.

Figure 3:
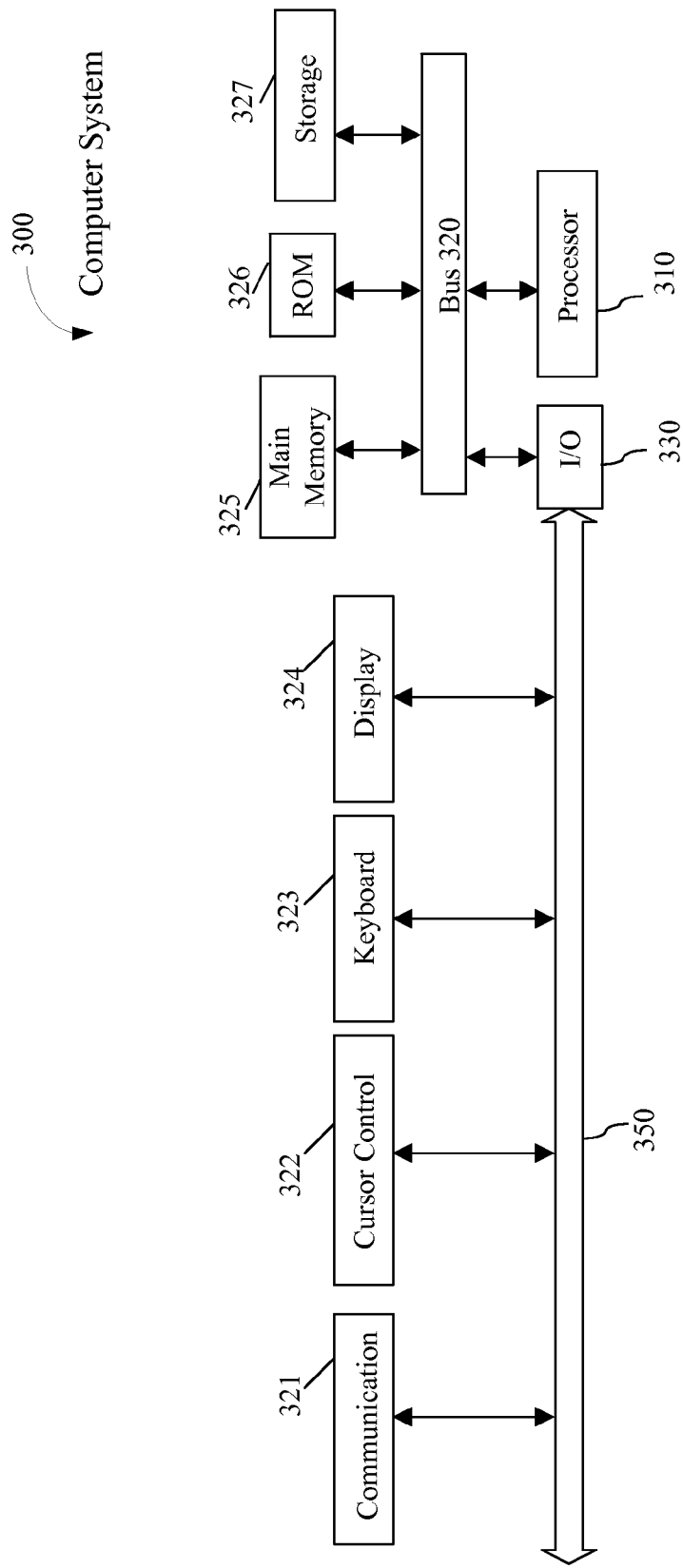
FIG. 3 illustrates one embodiment of a computer system.

FIG. 3 illustrates a computer system 300 on which data processing system 102 and/or server 108 may be implemented. Computer system 300 includes a system bus 320 for communicating information, and a processor 310 coupled to bus 320 for processing information.

Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and or other static storage device 326 coupled to bus 320 for storing static information and instructions used by processor 310.

A data storage device 327 such as a magnetic disk or optical disc and its corresponding drive may also be coupled to computer system 300 for storing information and instructions. Computer system 300 can also be coupled to a second I/O bus 350 via an I/O interface 330. A plurality of I/O devices may be coupled to I/O bus 350, including a display device 324, an input device (e.g., an alphanumeric input device 323 and or a cursor control device 322). The communication device 321 is for accessing other computers (servers or clients). The communication device 321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to perform operations comprising:
   receiving a print job;
   transmitting a query to two or more printers including a Job Definition Format (JDF) job ticket describing the media to be used for the job and a request for a time estimate to print the print job at each of the two or more printers to be based on a job description included in the JDF job ticket;
   receiving the time estimates from the two or more printers; and
   selecting a first of the two or more printers at which the print job is to be printed based on the received time estimates.

2. The article of manufacture of claim 1 comprising a machine-readable medium including data that, when accessed by a machine, further cause the machine to perform operations comprising:
   transmitting the print job to the first printer; and
   printing the print job at the first printer.

3. The article of manufacture of claim 2 wherein the print job is transmitted to the first printer with the query.

4. The article of manufacture of claim 3 comprising a machine-readable medium including data that, when accessed by a machine, further cause the machine to perform operations comprising transmitting a command to the first printer to print the print job upon selection of the first printer.

5. The article of manufacture of claim 1 wherein the job description includes a list of media request.

6. The article of manufacture of claim 1 wherein the query includes a page description language (PDL) program including null pages with media selection commands.

7. A print server comprising a printing software product to transmit a query to two or more printers including a Job Definition Format (JDF) job ticket describing the media to be used for the job and a request for a time estimate to print the print job at each of the two or more printers to be based on a job description included in the JDF job ticket, receive the time estimates from the two or more printers and select a first of the two or more printers at which the print job is to be printed based on the received time estimates.

8. The print server of claim 7 wherein the printing software product transmits the print job to the first printer with the query.

9. The print server of claim 8 wherein the printing software product transmits a command to the first printer to print the print job upon selection of the first printer.

10. A printing system comprising
    a print server to receive a print job; and
    a printer to receive a query from the print server including a Job Definition Format (JDF) job ticket describing the media to be used for the job, calculate a time estimate to print the print job based on a job description included in the JDF job ticket and transmit the time estimate to the print server.

11. The printing system of claim 10 wherein the printer calculates the time estimate based on at least one of a time to switch between simplex and duplex, size of a medium sheet, switching between input drawers, time to fold, staple, trim, and/or bind a job, and time to perform automated or manual maintenance or calibration, print resolution, print quality setting, print speed setting, paper weight, paper thickness, dryer or fuser temperature, simplex printing speed versus duplex printing speed, color versus monochrome speed.

12. The printing system of claim 10 wherein the print job is received from the print server with the query.

13. The printing system of claim 12 wherein the printer receives a command from the print server to print the print job upon a selection of the printer.

14. The printing system of claim 10 wherein the query includes a job description.

15. The printing system of claim 10 wherein the query includes a page description language (PDL) program including null pages with media selection commands.

16. A method comprising:
    receiving a print job;
    transmitting a query to two or more printers including a Job Definition Format (JDF) job ticket describing the media to be used for the job and a request for a time estimate to print the print job at each of the two or more printers to be based on a job description included in the JDF job ticket;
    receiving the time estimates from the two or more printers; and
    selecting a first of the two or more printers at which the print job is to be printed based on the received time estimates.

* * * * *